May 6, 1941.   R. WOXÉN   2,240,536
APPARATUS FOR DETERMINING THE NATURE OF SURFACES
Filed Jan. 31, 1939   4 Sheets-Sheet 1
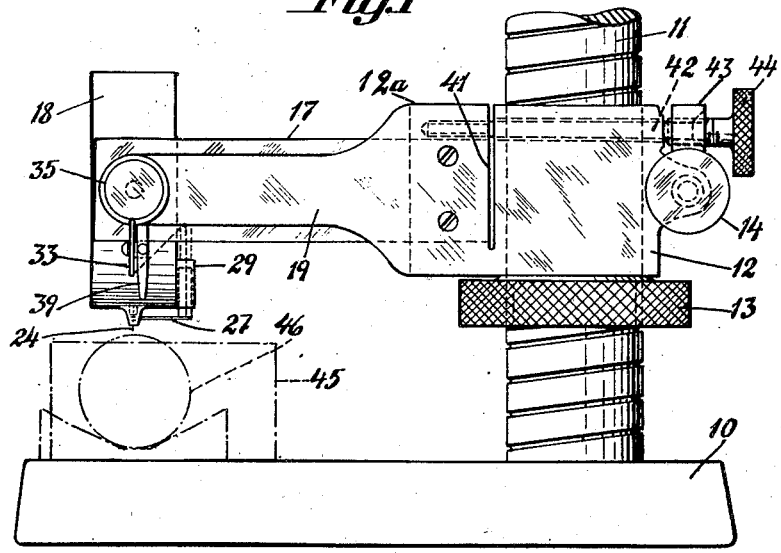
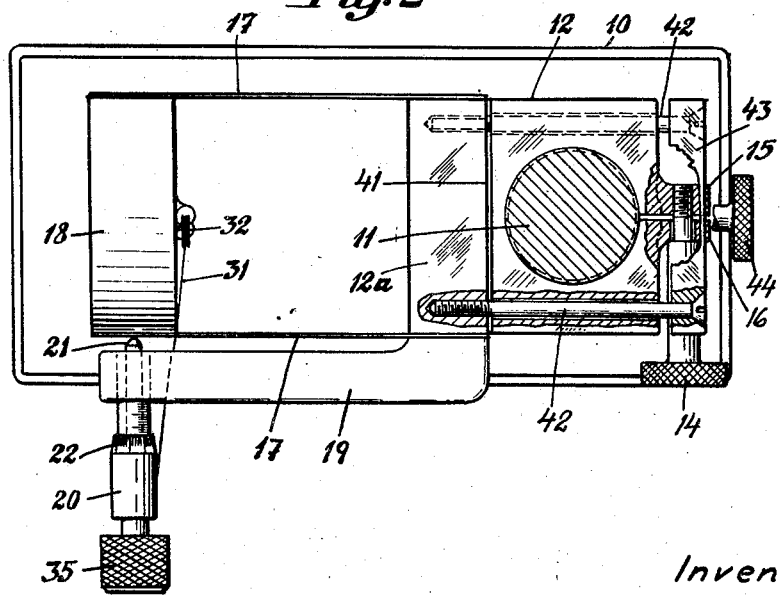
Inventor:
Ragnar Woxén
by George Bayard Jones
Attorney

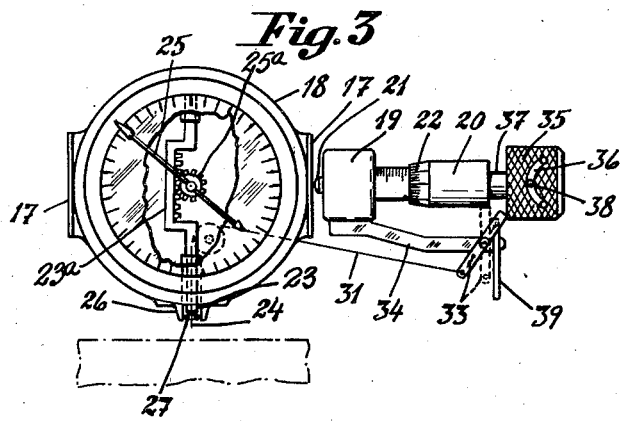
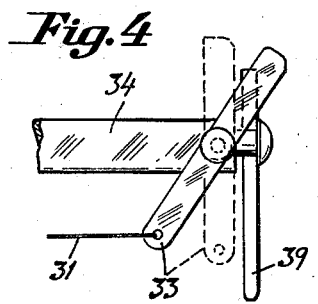
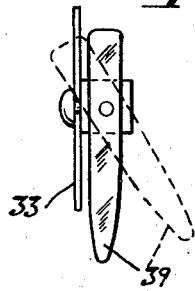
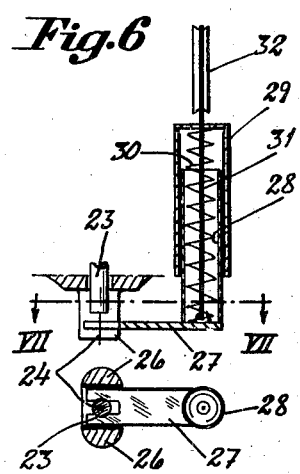
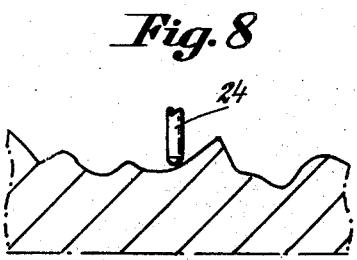

Inventor:
Ragnar Woxén
by George Bayard Jones
Attorney

May 6, 1941.  R. WOXÉN  2,240,536
APPARATUS FOR DETERMINING THE NATURE OF SURFACES
Filed Jan. 31, 1939   4 Sheets-Sheet 4

Inventor:
Ragnar Woxén
by George Bayard Jones,
Attorney

Patented May 6, 1941

2,240,536

UNITED STATES PATENT OFFICE 2,240,536

APPARATUS FOR DETERMINING THE NATURE OF SURFACES

Ragnar Woxén, Lidingö, Sweden, assignor to Aktiebolaget C. E. Johansson, Eskilstuna, Sweden, a company of Sweden Application January 31, 1939, Serial No. 253,859
In Sweden February 2, 1938

9 Claims. (Cl. 73—51)

Even if the surface of a body has been subjected to a very careful finishing treatment, such as grinding, polishing, and lapping, the surface is not plane or smooth and will always show more or less pronounced irregularities. Even if such irregularities are of a small magnitude, they have a very great influence on most of the properties of the surface, such as its coefficient of friction, reflecting power, heat transmission coefficient, resistance to corrosion, endurance strength, on the rate of wear in running fits, on the strength of the joint in a press fit, and so forth.

The nature or condition of a surface is illustrated by its profile curve, which means the curve that is formed if the body in question is assumed to be cut by a plane perpendicular to its surface. Highly magnified such a profile curve of a carefully finished surface may, for instance, have the appearance that is illustrated diagrammatically in Fig. 8 of the accompanying drawings.

Many methods and apparatus, optical as well as mechanical, have been proposed for the purpose of determining the shape of such a profile curve. The mechanical methods are based upon a needle or a pin, similar to a phonograph needle or stylus, being allowed to trail along the profile curve while its movements in the direction perpendicular to the surface are recorded in one manner or another.

This method, however, possesses several conspicuous disadvantages. Owing to the unevenness of the profile curve, the needle when moving along the curve, will easily get into oscillations, for instance when it passes over a "hill" or slides down into a "dale." These oscillations will be recorded, with the result that the recorded curve does not conform to the actual profile curve. Furthermore, while the needle moves along the surface, it is subjected to lateral forces which are quite considerable in comparison to the dimensions of the needle, for instance, when the needle is to move up from a steep "dale." For reason of strength, therefore, the point of the needle must be made comparatively coarse and more or less rounded. In apparatus used in practice the radius of the point of the needle has been about 0.03 mm. The consequence is that the needle cannot reach the bottom of deep narrow "dales" in the profile curve, and also that owing to the comparatively large radius of the point of the needle the "hills" as recorded will become entirely too rounded.

The present invention relates to an apparatus for determining the nature of surfaces of bodies, through which the disadvantages adhering to prior constructions are eliminated. The apparatus comprises a measuring needle which is movable in a direction towards the surface to be measured, a measuring instrument, such as a microindicator, which shows the position of the measuring needle relatively to the said surface, and means for effecting lateral movement of the needle and the surface relatively to one another.

According to the invention, the apparatus is principally characterized by the provision of means for raising the measuring needle from the surface, said means being associated with the means for effecting lateral movement of the measuring needle and the surface relatively to one another, in such manner that upon actuation of the last-mentioned means the measuring needle is first raised from the surface and only afterwards is moved laterally relatively to the same. When using this apparatus for determining the nature or condition of a surface, the measuring needle is thus moved in a direction towards the surface until it comes in contact with the latter, when the position of the measuring needle is read off or recorded, for instance by means of the micro-indicator, after which the needle is moved out of contact with the surface before it is moved laterally to the next point to be measured. In this way the trailing movement of the needle along the profile curve is avoided, which entails the advantage that the needle is not caused to oscillate, and that it will be subjected to very small lateral forces only. Therefore, the point of the needle may be made very thin so that the record of the profile curve will be practically correct.

The dimensions of the point of the needle are determined in the main by the specific surface pressure between the needle and the body, which must not be so high that the needle penetrates into the body.

With the present apparatus the measuring pressure on the needle may be kept within the magnitude of fractions of a gram.

Preferably, the needle is made of a material of a high strength, such as steel, and may be given exceedingly small dimensions as compared with the needles used according to prior measuring methods.

The invention will be further described here below, reference being had to the constructional forms of apparatus which are illustrated by way of example in the accompanying drawings, and in connection therewith further characterizing features of the invention will be described.

Figs. 1, 2 and 3 show, respectively, a side elevation, a top plan view, and a partial end elevation of a measuring apparatus constructed according to the invention.

Figs. 4 and 5 show a detail of the same apparatus in two projections at right angles to one another.

Fig. 6 shows a section through another detail of the apparatus, and Fig. 7 shows a section on the line VII—VII in Fig. 6.

Fig. 8 illustrates diagrammatically and highly magnified a measuring needle and a profile curve.

Figure 9:
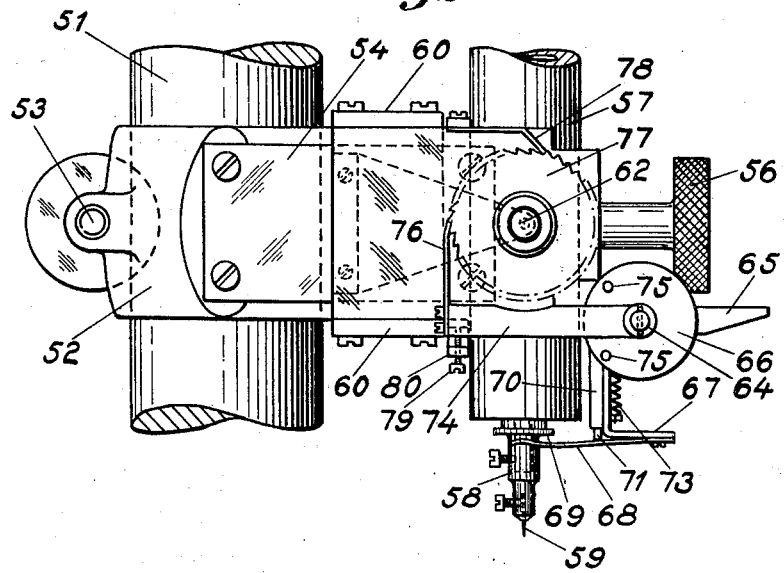
Figure 10:
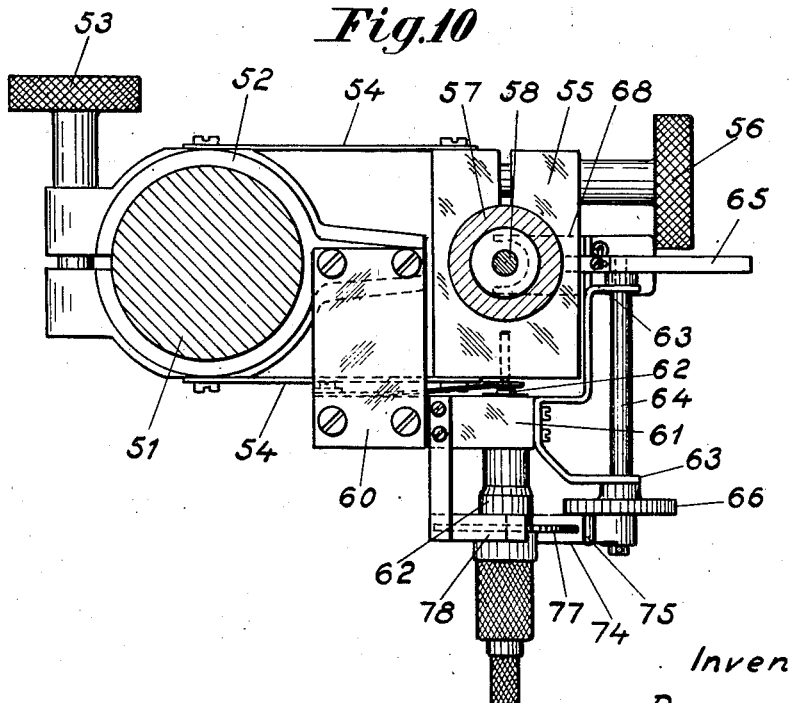
Figure 11:
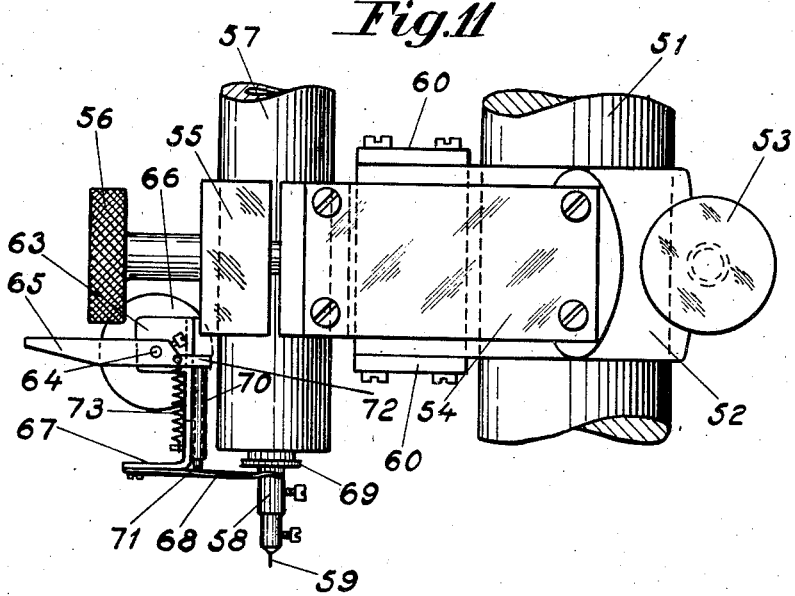
Figure 12:
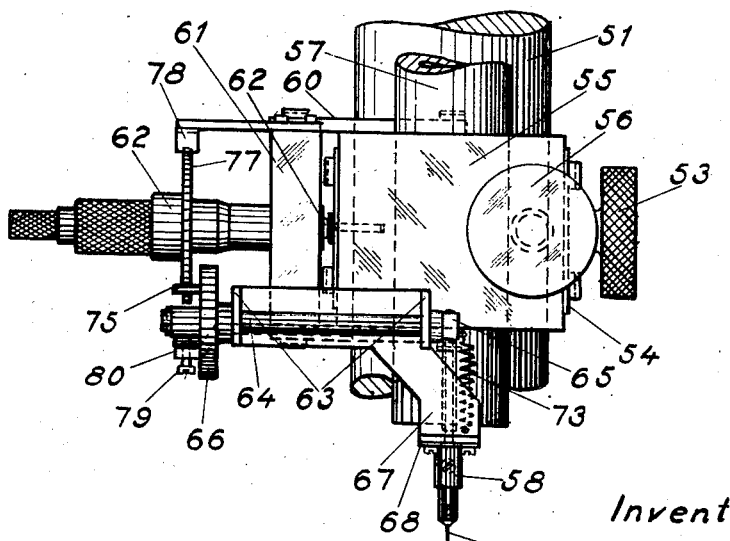

Figs. 9 to 12, inclusive, show a modified constructional form of the apparatus, of which Fig. 9 shows a front view, Fig. 10 shows a top plan view partly in section, Fig. 11 shows a rear view, and Fig. 12 shows the apparatus viewed from the right in Fig. 9.

Referring to Figs. 1 to 7 of the drawings, 10 denotes a frame base plate which supports a screw-threaded standard 11, which in its turn supports a sliding bracket 12 preferably slotted in the rear. The bracket 12 may be moved along the standard by rotating a nut 13, and is locked in the desired position by means of a screw 14 which passes through lugs 15, 16 on the bracket at the slotted portion thereof, as shown in Fig. 2. Two flat springs 17 which support a micro-indicator 18, are rigidly attached to the bracket 12 in such manner that the indicator will be moved parallel or substantially parallel to the upper face of the base plate 10 when the springs are bent in the lateral direction. On the other hand, the springs are stiff in the direction perpendicular to the former, that is, in the vertical direction. This spring arrangement ensures that the movement of the micro-indicator is entirely free of lost motion. There is also attached to the bracket 12 an arm 19 in which a micrometer screw 20 is provided, the movable member 21 of which is adapted to actuate the springs 17 and the indicator 18. The micrometer screw 20 is provided in a well-known manner with a scale 22 for reading off the horizontal movement of the member 21 and thus of the indicator 18.

From the lower side of the indicator projects a pin 23, Fig. 6, which carries a needle or measuring stylus 24 having a very small diameter and radius at its point.

The vertical movements of the measuring needle 24 are indicated by the pointer 25 of the micro-indicator, preferably in such manner that one rotation of the said pointer corresponds to a movement of a few thousandths of a millimeter of the measuring needle. The operative connection between the pin 23 and pointer 25 may be effected by any suitable means, such means being shown somewhat diagrammatically in Fig. 3 as consisting of a toothed rack 23a attached to an extension of the pin 23 and meshing with a toothed pinion 25a attached to the pointer 25. The indicator 18 is provided on both sides of the delicate measuring needle 24 with lugs 26 which protect the needle when the latter occupies its upper position.

According to the present invention the movable elements 23, 24 of the indicator are arranged to be actuated by the micrometer screw 20 to be lifted as a preliminary to the rotation of the micrometer screw 20 and the stem on which it is mounted. The operating means required for this purpose consist, in the present instance, of a raising arm 27 the slotted end of which projects below the pin 23, and which is preferably guided by the lugs 26, Fig. 7. The arm 27 is attached to a plunger 28 which is movable in a sleeve 29 attached to the indicator 18. Inserted in the sleeve 29 and plunger 28 is a spring 30 which tends to move the arm 27 downward and thus to release the measuring needle 24. A thread 31 runs from the arm 27 upwards through the plunger 28 and sleeve 29 over a small wheel 32 to a lever 33 which is pivoted to a support 34 rigidly secured to the arm 19. The other end of the lever 33 bears against a sleeve 35 provided on the micrometer screw 20. This sleeve is provided with a curve-shaped groove or slot 36, which is engaged by a pin 38 rigidly secured to the stem 37 of the micrometer screw, and is preferably knurled to serve as a manually actuated knob to perform the double function of raising said measuring needle and rotating said micrometer screw.

If the sleeve 35 is turned in one direction or the other from the middle position shown in Fig. 3, there is some lost motion while it is displaced axially relatively to the stem 37 of the micrometer screw, until the pin 38 is engaged by one of the ends of the slot or groove 36. During this initial rotation of said sleeve, the lever 33 is rocked from its full line position to the position shown in dotted lines in Figs. 3 and 4, in which the measuring needle 24 of the indicator is raised from the surface to be measured. The actuating lever 37 may be locked in the position just described by means of a pawl 39, as illustrated in dotted lines in Fig. 5. Upon further rotation of said sleeve, the stem 37, actuating the point 21, is entrained in the rotation and deflects the springs 17, 17.

The bracket 12 is preferably slotted through a portion of its height, as indicated at 41, Figs. 1 and 2. Screw-threaded into the upper outer portion 12a of the bracket are two pull rods 42 which are free to rotate and slide lengthwise in the portion of the bracket immediately surrounding the standard 11. Outside the bracket the pull rods 42 are seated in a yoke 43, in the middle of which a screw 44 is threaded, which when tightened presses against the bracket 12 and tends to force the yoke away from said bracket, thus producing a pull in the rods 42, with the result that the outer portion 12a of the bracket is deflected upwards. By proper dimensioning of the slot 41, or by providing stops or the like, the upward deflection of the portion 12a is adjusted with respect to the stresses in the portion below the slot caused by the said deflection in such manner that said stresses are kept within permissible values.

The body the nature of the surface of which is to be investigated, and which may be, for instance, a body 45 having a plane surface, or a cylinder 46, is placed on the bottom plate 10, as shown in Fig. 1. By means of the nut 13 the bracket 12 is adjusted, preferably in such manner that the lower lugs 26 of the indicator contact with the body to be measured. During this operation the measuring needle 24 occupies its upper position, and the pawl 39 may be in the position shown in dotted lines in Fig. 5, engaging and locking the lever 33 in the position shown in dotted lines in Fig. 4. The bracket having been locked to the standard 11 by means of the screw 14, the indicator is adjusted in a suitable position of height above the surface to be measured by the aid of the screw 44. Simultaneously, the point 21 of the micrometer screw is moved in contact with the adjacent spring 17. When the pawl 39 is now turned to the position shown in fulldrawn lines in Fig. 5, the arm 27 moves down under the action of the spring 30. The pin 23 of the indicator and the measuring needle 24 are thus released and move downward until the latter comes to bear against the surface to be measured. The position of the pointer 25 of the indicator 18 is read off. For making the next measuring operation the indicator with its measuring needle is to be moved some distance along the surface to be measured. This is attained by turning the micrometer screw, the point 21 of which deflects the springs 17 and moves the indicator 18, carried thereby, a little to one side.

According to the invention, no displacement of the indicator will take place until the sleeve 35 has been turned relatively to the stem 37, so that the pin 38 comes to bear against one end of the curve-shaped groove 36. While the sleeve 35 is turned on the stem 37, it is displaced axially to the left in Fig. 3 due to the engagement of the pin 38 with the groove 36. Therefore, the operating members 33, 31, 27 actuated by the sleeve 35 will have raised the members 23, 24 from the surface to be measured before the pin 38 reaches the end of the groove 36. Upon further rotation of the sleeve 35, the point 21 of the micrometer displaces the indicator through a distance which is read off on the scale 22, and which may be a few thousandths or hundredths of a millimeter. When the sleeve 35 is released, it returns to its normal or outer position shown in Fig. 3, under the influence of the spring 30 and the intermediate members, and the measuring needle 24 can again move down against the surface to be measured, which gives a new indication of the pointer 25. In this way an examination of the nature of the surface to be measured is carried out by moving the indicator over the surface, or over a portion thereof, from one point to another, the measuring needle 24 being automatically raised each time before a lateral movement of the indicator over the surface to be measured can take place. The closer the points measured are located relatively to one another, and the more measurements are carried out, the more accurately is the profile curve measured, and the more thorough is the knowledge gained of the condition of the surface.

The number of points measured and the distance between the same are preferably suited to the height of the profile of the surface, that is to say, the height between the highest and the lowest points of the profile curve.

The constructional form illustrated in Figs. 9 to 12 inclusive, differs from that above described principally by the operating member for actuating the means for raising the measuring needle and the means for effecting lateral movement of said needle, consisting of a depressible key or the like which is connected with the said means for effecting lateral movement of the measuring needle, which means consists also in this case of a micrometer screw, through a coupling or motion transmission device, which has a certain play or lost motion, and a ratchet feed device, in such manner that upon each depression of the key the measuring needle is moved laterally a definite distance relatively to the surface to be investigated. The feed pawl of the ratchet feed device is arranged to cooperate with an adjustable stop which limits the length of stroke of the feed pawl, so that by adjustment of the said stop the length may be changed of the distance which the measuring needle is displaced laterally upon each depression of the key.

Also in this case the standard 51 is mounted on a base plate, not shown, and carries a slotted bracket 52, which is slidable as well as capable of turning on the standard 51 and may be locked in the desired position on the latter by means of a clamp screw 53.

Secured to the bracket 52 are two flat springs 54 which support a slotted cross-piece 55 having a clamp screw 56, and in which the shaft 57 of a micro-indicator is secured, the upper portion and the indicator device of said micro-indicator not being shown in the drawings.

The measuring pin 58 of the micro-indicator is movable up and down in the hollow shaft and supports the measuring needle 59 at its lower end projecting from the shaft.

Also secured to the bracket 52 by means of an upper and a lower horizontal plate 60 is a side-piece 61 which carries a micrometer, the screw 62 of which serves to actuate the cross-piece 55 for effecting lateral movement of the measuring needle 59.

A yoke 63 is secured to the side-piece 61, and a spindle 64 is rotatably journalled in the two shanks of said yoke parallel to the micrometer screw. Secured to one end of said spindle 64 is a key 65 which constitutes the operating member of the apparatus, and a disk 66 is secured to the other end of said spindle.

Secured to an L-shaped arm 67 depending from the yoke 63 is a flat spring 68 the free fork-shaped end of which is located below a flange 69 on the measuring pin 58 of the micro-indicator for the purpose of raising the latter and thus also the measuring needle 59. Normally it is prevented herefrom by a pin 71 which bears against the spring 68 and which is slidable in a guide sleeve 70 secured to the arm 67, the upper end of said pin bearing against a rear extension 72 of the key 65, which is normally retained by a spiral spring 73, which is stronger than the flat spring 68, in the inoperative position shown in Figs. 9 and 11.

Rotatably mounted on the end of the spindle 64 projecting outside the disk 66 is a lever 74, the turning movement of which relatively to the disk 66 is limited by two stop pins 75 secured to said disk.

At its free end the lever 74 carries a flexible feed pawl 76 which engages a toothed wheel 77 secured to the micrometer screw 62 and serves to turn said wheel in the clockwise direction in Fig. 9. The toothed wheel is also engaged by a pawl 78 which prevents backward motion of the wheel.

Downward movement of the lever 74 is limited by an adjustable stop in the form of a screw 79 which is screw-threaded into an arm 80 projecting from the side-piece 61, and upward movement of the lever 74 is limited by the toothed wheel 77.

When the body, the nature of the surface of which is to be investigated, has been placed on the base plate, the micro-indicator is set by adjusting the bracket 52 on the standard 51 in such manner that the measuring needle 59 contacts with the surface of the body.

When afterwards the key 65 is depressed the spring 68 is immediately relieved of the pressure of the pin 71, so that the spring 68 swings upwards and the fork-shaped end of the same engages the lower side of the flange 69 on the measuring pin 58 and raises the latter and thus also the measuring needle 59 from the surface of the body. Upon further depression of the key 65 the lower pin 75 on the disk 66 engages the lever 74 and swings the latter and thus also the feed pawl 76 upwards as viewed in Fig. 9.

In this way the toothed wheel 77 and thus also the micrometer screw 72 is turned through a certain angle in the clockwise direction in Fig. 9, with the result that the entire cross-piece 55 and the micro-indicator supported by the same with its measuring needle 59 are moved laterally a corresponding distance, for instance one hundredth of a millimeter, upwards as viewed in Fig. 10, the measuring needle being thus displaced laterally relatively to the surface of the body to be investigated.

The upward movement of the lever 74 and thus of the feed pawl 76 is limited by the upper side of the lever coming to bear against the lower side of the toothed wheel 77.

When the key 65 is released, it is returned by the spring 73 to the inoperative position shown in Figs. 9 and 11, and therefore, the pin 71 again depresses the spring 68 so that said spring releases the measuring pin 58, and the measuring needle 59 will again move down in engagement with the surface of the body, the height of the surface at this particular measuring place being read off on the micro-indicator. Simultaneously, the lever 74 is returned by gravity to rest against the screw 79, while the pawl 78 prevents backward motion of the toothed wheel 77.

In this way, therefore, upon each depression of the key 65 the measuring needle 59 will first be raised from the surface of the body, and is afterwards displaced a certain distance laterally relatively to the same.

By adjusting the stop screw 79 for the lever 74 the length of stroke of the feed pawl 76 may be varied, so that upon each depression of the key 65 the toothed wheel 77 is turned through an angle of one or more teeth, and thus the length of the distance through which the measuring needle is displaced laterally upon each such depression of the key is varied correspondingly.

The invention may of course be varied in many respects without departing from the fundamental idea of the same.

I claim:

1. Apparatus for determining the nature of surfaces of bodies, comprising in combination a measuring needle movable in a direction towards the surface to be measured, a measuring instrument cooperating with said measuring needle so as to show the position of the latter relatively to said surface, manually adjustable means for effecting lateral movement of said needle and said surface relatively to one another, and means for raising said measuring needle from said surface, said means for raising said needle being associated with said manually adjustable means for effecting lateral movement of said needle by a lost motion connection, so that upon initial actuation of said manually adjustable means, said measuring needle is raised from the surface to be measured, and is afterwards moved laterally relatively to the same upon further actuation of said means.

2. Apparatus for determining the nature of surfaces of bodies, comprising in combination a measuring needle movable in a direction towards the surface to be measured, a measuring instrument cooperating with said measuring needle so as to show the position of the latter relatively to said surface, means for effecting lateral movement of said needle and said surface relatively to one another, means for raising said measuring needle from said surface, and an operating member cooperating with said means for raising said needle and with said means for effecting lateral movement of said needle in such manner that upon actuation of said operating member said measuring needle is first raised from the surface and is afterwards moved laterally relatively to the same.

3. Apparatus for determining the nature of surfaces of bodies, comprising in combination a measuring needle movable in a direction towards the surface to be measured, a measuring instrument cooperating with said measuring needle so as to show the position of the latter relatively to said surface, a micrometer device for effecting lateral movement of said needle and said surface relatively to one another, said device having a micrometer screw and an operating member therefor having a lost motion connection therewith, and means for raising said measuring needle from said surface, said means being actuated by the initial movement of said operating member, whereby said lateral movement is not effected until after said needle has been raised.

4. Apparatus for determining the nature of surfaces of bodies, comprising in combination a measuring needle movable in a direction towards the surface to be measured, a measuring instrument cooperating with said measuring needle so as to show the position of the latter relatively to said surface, means for effecting lateral movement of said needle and said surface relatively to one another, means for raising said measuring needle from said surface, an operating member cooperating with said means for raising said needle and with said means for effecting lateral movement of said needle in such manner that upon actuation of said operating member said measuring needle is first raised from the surface and is afterwards moved laterally relatively to the same, a bracket, and springs attached to said bracket and supporting said measuring needle so as to allow lateral movement of the same without lost motion, said springs being stiff in the direction of movement of said measuring needle towards the surface to be measured.

5. Apparatus for determining the nature of surfaces of bodies, comprising in combination a measuring needle movable in a direction towards the surface to be measured, a measuring instrument cooperating with said measuring needle so as to show the position of the latter relatively to said surface, means for effecting lateral movement of said needle and said surface relatively to one another, means for raising said measuring needle from said surface, said means comprising a movable arm, an operating member cooperating with said means for raising said needle and with said means for effecting lateral movement of said needle in such manner that upon actuation of said operating member said measuring needle is first raised from the surface and is afterwards moved laterally relatively to the same, and lugs projecting from said measuring instrument on opposite sides of said measuring needle so as to protect the latter and serving as a guide for said movable arm.

6. Apparatus for determining the nature of surfaces of bodies, comprising in combination a measuring needle movable in a direction towards the surface to be measured, a measuring instrument cooperating with said measuring needle so as to show the position of the latter relatively to said surface, means for effecting lateral movement of said needle and said surface relatively to one another, means for raising said measuring needle from said surface, an operating member cooperating with said means for raising said needle and with said means for effecting lateral movement of said needle in such manner that upon actuation of said operating member said measuring needle is first raised from the surface and is afterwards moved laterally relatively to the same, a bracket having a portion flexible in a plane forming an angle to the surface to be measured, means for adjusting said flexible portion relatively to the remainder of said bracket, and springs attached to said flexible portion of said bracket and supporting said measuring needle so as to allow lateral movement of the same without lost motion, said springs being stiff in the direction of movement of said measuring needle towards the surface to be measured.

7. Apparatus for determining the nature of surfaces of bodies, comprising in combination a measuring needle movable in a direction towards the surface to be measured, a measuring instrument cooperating with said measuring needle so as to show the position of the latter relatively to said surface, means for effecting lateral movement of said needle and said surface relatively to one another, means for raising said measuring needle from said surface, an operating member cooperating with said means for raising said needle and with said means for effecting lateral movement of said needle in such manner that upon actuation of said operating member said measuring needle is first raised from the surface and is afterwards moved laterally relatively to the same, said operating member consisting of a depressible key, a motion transmitting device allowing a certain play, and a ratchet feed device, said motion transmitting device and said ratchet feed device connecting said depressible key with said means for effecting lateral movement of said needle in such manner that upon each depression of said key said means is actuated to move said measuring needle a definite distance laterally relatively to the surface to be measured.

8. Apparatus for determining the nature of surfaces of bodies, comprising in combination a measuring needle movable in a direction towards the surface to be measured, a measuring instrument cooperating with said measuring needle so as to show the position of the latter relatively to said surface, means for effecting lateral movement of said needle and said surface relatively to one another, means for raising said measuring needle from said surface, an operating member cooperating with said means for raising said needle and with said means for effecting lateral movement of said needle in such manner that upon actuation of said operating member said measuring needle is first raised from the surface and is afterwards moved laterally relatively to the same, said operating member consisting of a depressible key, a motion transmitting device allowing a certain play, a ratchet feed device having a feed pawl, and an adjustable stop for said feed pawl controlling the length of stroke of the same, said motion transmitting device and said ratchet feed device connecting said depressible key with said means for effecting lateral movement of said needle in such manner that upon each depression of said key said means is actuated to move said measuring needle a definite distance laterally relatively to the surface to be measured.

9. Apparatus for determining the nature of surfaces of bodies, comprising in combination a thin pointed measuring pin having a support movable in a direction towards the surface to be measured, a measuring instrument cooperating with said measuring pin so as to show the position of the latter relatively to said surface, a micrometer having a screw engaging said support for effecting lateral movement of said pin and said surface relatively to one another, means for raising said measuring pin from said surface, an operating member cooperating with said means for raising said pin and with said means for effecting lateral movement of said pin in such manner that upon actuation of said operating member said measuring pin is first raised from the surface and is afterwards moved laterally relatively to the same, said operating member consisting of a depressible key, a rotatably mounted member to which said key is connected to oscillate the same, stops on said member, an arm pivoted at the axis of rotation of said member and extending between said stops to provide a lost motion connection, a feed pawl on said arm, a ratchet wheel secured to said micrometer screw and engaged by said feed pawl, and an adjustable stop for said feed pawl controlling the length of the stroke of the same, whereby upon each depression of said key said micrometer screw is rotated to move said measuring pin a definite distance laterally relatively to the surface to be measured.

RAGNAR WOXÉN.